May 12, 1959  C. V. FRENCH ET AL  2,886,484
NORMAL CURED DRY PRESSED PRODUCTS
Filed May 25, 1954  2 Sheets-Sheet 1
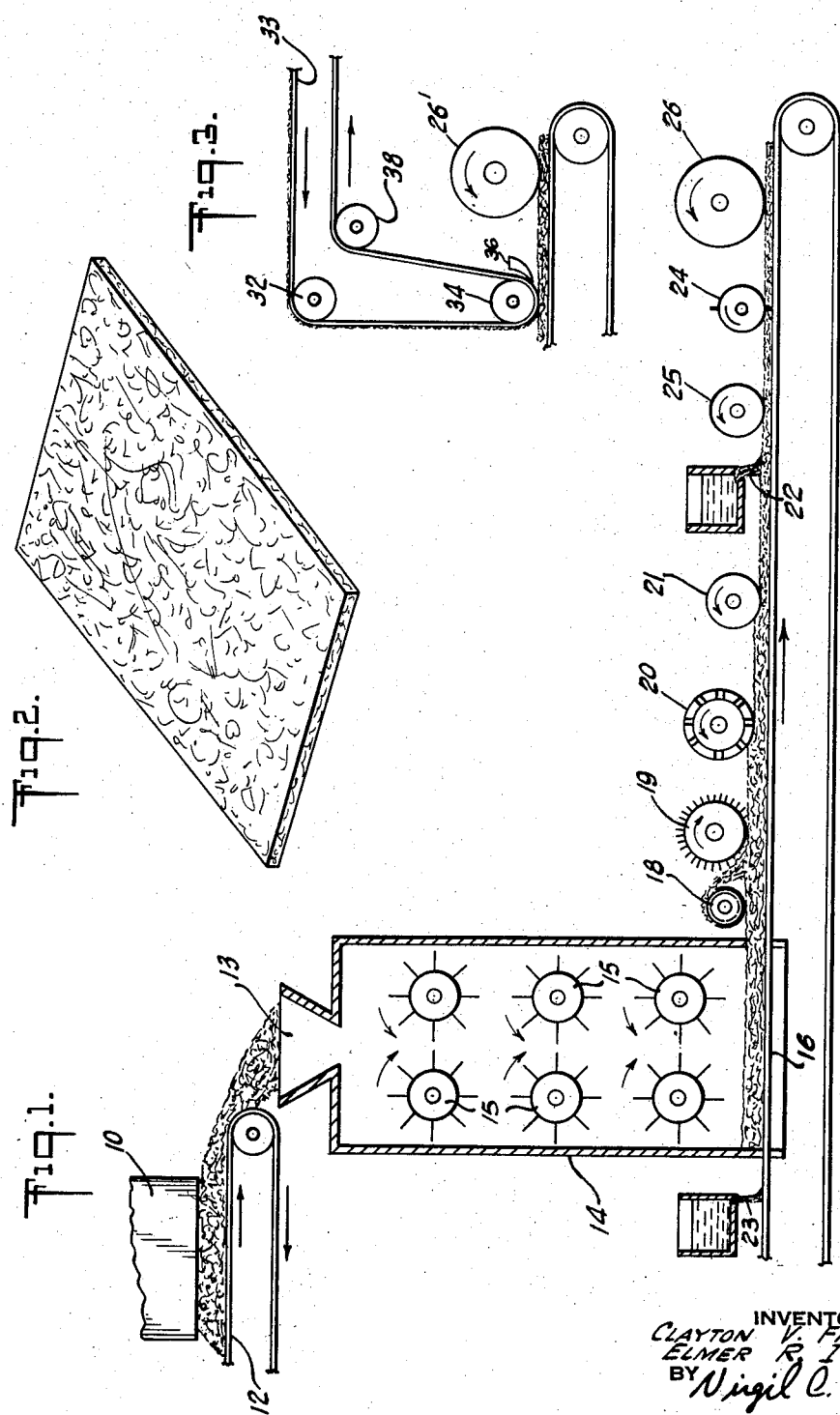
INVENTORS:
CLAYTON V. FRENCH
ELMER R. IHNE
BY
ATTORNEY

INVENTORS:
CLAYTON V. FRENCH
ELMER R. IHNE
BY
ATTORNEY

2,886,484

NORMAL CURED DRY PRESSED PRODUCTS

Clayton V. French and Elmer R. Ihne, Somerville, N.J., assignors to Johns-Manville Corporation, New York, N.Y., a corporation of New York Application May 25, 1954, Serial No. 432,246

13 Claims. (Cl. 162—201)

This invention relates to a method of manufacturing fiber-cement sheets and more particularly to a method of manufacturing sheets containing asbestos fiber and cement for use as structural building materials.

The herein disclosed invention is an improvement upon the manufacturing procedure outlined in U.S. Patent No. 2,230,880, issued to George B. Brown February 4, 1941. The procedure outlined in this patent has formed the base for the current large scale manufacture of what are conventionally termed dry pressed asbestos cement shingles, sliding units, etc. While the procedure has met with such substantial commercial success, it has limitations which prevent its utility in manufacturing certain types of dry process products and various problems have arisen in manufacture utilizing the steps outlined. As suggested in the Brown patent the commercial products formed in accordance with that procedure normally are subjected to steam curing. While a fiber-cement sheet can be obtained by the therein described process employing a normal air curing rather than autoclaving, such sheets cannot be fabricated on a continuous basis. In the procedure disclosed in the Brown patent the ultimate consolidating pressure is applied by means of a platen press. The process has been adapted to a commercially acceptable one capable of being run on continuous basis by employing a single roller to exert the final consolidating pressure. With this change in the process, however, it was found to be impossible to fabricate a normal cured sheet while following the teachings of the patent.

Accordingly, it is an objective of this invention to provide a method of manufacturing normal cured fiber-cement sheets on a continuous basis employing a dry press procedure.

It is another object of this invention to provide a method of manufacturing normal cured fiber-cement sheets which may be provided with a smooth surface.

It is a further and more specific object of this invention to provide a method of manufacturing normal cured fiber-cement sheets having a high modulus of rupture and good flexibility, rendering them suitable for use as structural materials.

The invention will be more fully understood and further objects and advantages will become apparent when reference is made to the following detailed description of a preferred embodiment of the invention and to the accompanying drawings wherein:

Fig. 1 shows diagrammatically a side elevation of an apparatus which may be utilized with this invention;

Fig. 2 shows a perspective view of the finished fiber-cement sheet;

Fig. 3 shows diagrammatically an alternate form of the apparatus illustrated in Fig. 1.

Figure 4:
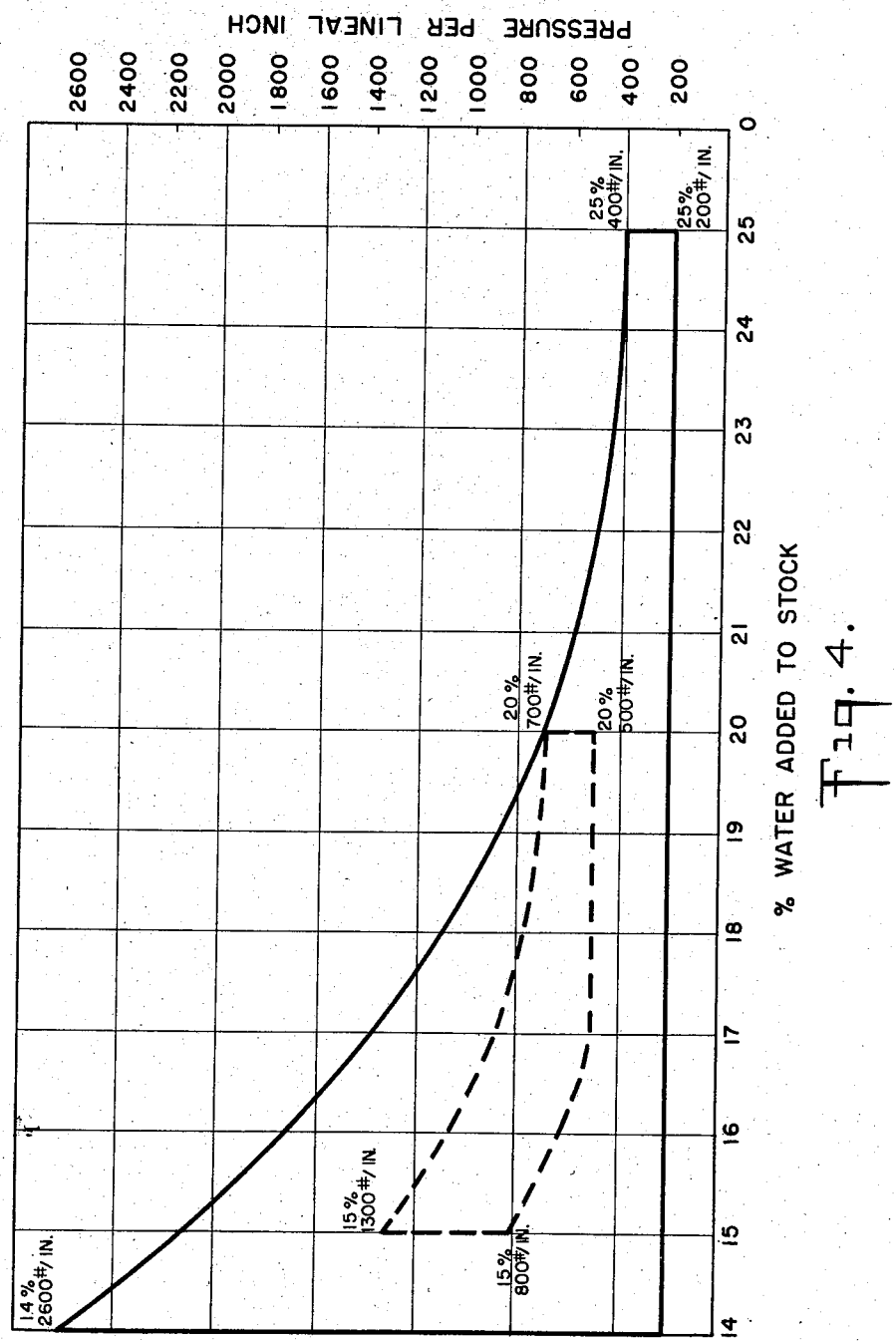
Fig. 4 is a graph showing the limits of the variable conditions capable of being employed in this invention.

In general, the preferred method of manufacturing a dry process normal cured fiber-cement sheet in accordance with this invention comprises dispersing an intimate mixture of cement particles, staple reinforcing fiber, and, preferably, filler or aggregate particles in air to form an air suspension thereof, depositing the suspended mixture as a layer upon a felting member to form a web, applying water to the web in amount approximately 14 to 25% by weight of the uncured densified web, compressing the web employing a consolidating roller exerting a pressure of approximately 200 to 2600 lbs. per transverse lineal inch while preserving the relation between the water content and the pressure applied within the approximate limits indicated by the solid lines in the accompanying Fig. 4, and then air curing the compressed and densified web to harden the cement therein. It is mandatory to retain the relation of water content of the web and consolidating and densifying pressure applied to the web in the manner indicated in Fig. 4 in order that a normal cured sheet may be obtained from such a procedure on a continuous basis. When the relationships are not preserved either the web will be ruptured under the consolidating and densifying roller or the obtained sheet will not have any substantial strength due to lack of hydration of the cement.

The normal cured fiber-cement sheets formed in accordance with the aforementioned procedure exhibit physical characteristics which render them admirably suitable for use as structural materials. Such sheets, when tested with normal moisture content, exhibit a modulus of rupture of approximately 2500 to 5000 lbs. per sq. in. and a modulus of elasticity of approximately 1 to 2.5 million lbs. per sq. in. It is characteristic of these products, contrary to normal sheet manufacture, that an increase in modulus of rupture does not have associated with it an increase in the modulus of elasticity. Since higher moduli of elasticity are indications of lower flexibilities, preservation of lower moduli of elasticity with increase in modulus of rupture is very advantageous. This also results in greater impact resistance in the sheet since this characteristic is a function of the modulus of rupture squared divided by the modulus of elasticity. Good impact resistance is particularly important with such products since they are often used to span framing members and must be capable of withstanding blows in the area spanning these members.

The formulation of the furnish, composed of staple reinforcing fiber-cement and preferably filler or aggregate, may be substantially varied and normal cured sheets can be obtained employing conventional dry process fiber-cement compositions in the herein defined procedure. For use in this invention the staple reinforcing fiber content of the formulation may range between approximately 15 to 50% by weight of the uncured, compressed and densified "green" sheets and the preferred fiber is a virgin asbestos fiber of the 5 or 6 grade as classified under Q.A.M.A. Standard Quebec Screen Test.

The total binder ingredients in the furnish may comprise approximately 35 to 60% by weight of the "green" sheet and will normally be all cement particles, preferably Portland cement. As indicated in the Brown patent, other hydraulic cements such as a calcium aluminate cement may be employed in place of the preferred Portland cement. If desired, fillers or aggregates such as ground rock, silica, shingle scrap, etc., may be employed in the furnish in amount up to 40% by weight of the "green" sheet. While reactive silica is often preferred in furnishes used to manufacture dry process sheets commercially, no particular advantage is obtained in its use in this invention. Since the products formed in accordance with this invention are air cured, it will be appreciated that any siliceous material present in the furnish will only serve the function of filler and will not have any substantial reaction with the Portland cement. This is true since the sheet is not exposed to temperatures of the nature of those found in an autoclave and such temperatures are necessary to obtain any substantial reaction between the lime of the cement and the silica.

In order to obtain a normal cured dry process sheet in accordance with the invention, water in amount at least approximately 14% by weight of the "green" sheet must be added during the forming procedure. Less water has been found insufficient to hydrate the cement present in the sheets and hence insufficient to enable the formation of a product with sufficient strength to allow its use as a structural material. No more water than approximately 25% by weight of the "green" sheet can be applied to the web in accordance with this invention since higher amounts of water result in rupture of the sheet upon its entry to the consolidating and densifying station. In order to obtain the preferred normal cured dry process sheets of optimum characteristics, i.e., sheets having a modulus of rupture of approximately 3500 to 4500 lbs. per sq. in. and a relatively low modulus of elasticity of 1.5 to 2 million lbs. per sq. in., water amount within the range of approximately 15 to 20% is employed.

As heretofore indicated, in order to obtain the desired fiber-cement sheets of this invention on a continuous basis, the web to which such amounts of water have been applied must be subjected to a pressure roller which exerts a densifying and compressing force upon the web which ranges between approximately 200 to 2600 lbs. per transverse lineal inch. Lesser pressures fail to result in a handleable sheet and higher pressures serve to disrupt the web and hence prevent the formation of a sheet. In order to obtain the aforementioned preferred normal cured dry process sheets in accordance with this invention the consolidating and densifying pressure will range between 500 and 1300 lbs. per lineal inch.

As heretofore stated the relation between the amount of water added must be carefully preserved within the conditions indicated in the accompanying Fig. 4. As may be seen from a consideration of this figure, the higher consolidating pressures are employed in densifying sheets formed with lower water contents. As the water content increases substantially lower consolidating pressures must be used. The fiber content of the furnish also has a substantial effect upon the relation of pressure and hydrating water. In Fig. 4 the upper portion of the curve area given is related to the herein defined lower fiber contents. With increasing fiber contents the curve of relationship between water and pressure will fall lower in the range indicated in the figure. The preferred range of curves relating to sheets having a water content of 15 to 20% by weight of the "green" sheet and consolidating pressures ranging between 500 and 1300 lbs. per lineal inch primarily relate to preferred fiber furnishes containing asbestos fiber in amount approximately 35 to 45% by weight of the "green" sheet.

It is of particular note that sheets of relatively high density may be obtained when employing the water contents and consolidating pressures in the right-hand portion of the curves illustrated in Fig. 4. Such sheets have relatively high moduli of rupture and yet exhibit relatively low moduli of elasticity and hence good flexibility, a desirable characteristic. This is rather surprising since it might be expected that relatively dense products could not be obtained using such lower consolidating pressures.

The apparatus diagrammatically illustrated in the drawings is that of the preferred equipment utilized in carrying out the steps of the improved method of manufacture of this invention. As Fig. 1 clearly indicates, the apparatus is generally similar to that disclosed in the aforementioned patent to George B. Brown with the modification of the use of a consolidating and densifying roller as the ultimate press station instead of a platen press as disclosed therein. Referring particularly to Fig. 1, a mixture of fiber, cement particles, and preferably aggregate particles, formulated as indicated above, is fed to hopper 10. From the hopper the mixture is conveyed by any suitable means, such as conveyor 12 through opening 13 into the fluff box 14.

As illustrated in the drawing, the fluff box 14 is used to disperse the intimate mixture in an air suspension in order to allow uniform deposition of felting of the material on felting member 16. Fluff box 14 preferably contains convenient dispersing means such as spike rollers 15 arranged in pairs and usually rotated towards each other and, at points between any given pair of rollers, in the direction of the felting member 16. With such rotation, the air-suspended material is driven by spike rolls 15 in the direction of the felting member 16. The spike rollers may be driven at various speeds, depending in part upon the size of the rollers and the degree of packing desired on the felting member. As in the example set forth in the Brown patent, with spike rollers of an overall diameter of 7–11" the rotation may be at the rate of about 200–1000 r.p.m.

Fluff box 14 opens at the bottom above the felting member 16 which preferably comprises a moving conveyor of substantially impermeable fabric such as a rubber or rubberized canvas of the type commonly utilized on a dry process asbestos and cement shingle machine. In its upper reach, this belt moves to the right in the arrangement shown in Fig. 1. Upon emerging from fluff box 14, the belt passes under a picker roll 19 of a conventional type, which levels off the top of the deposited material and throws any excess back into a screw or scroll conveyor 18 which carries it off. The excess air carried in the relatively thick deposited layer is removed by any suitable means, as by pressing thereagainst a member such as roller 20. The face of this roller is preferably constructed with closely spaced perforations in order to allow the air to escape without having the roller pick up any of the felted materials. The layer of asbestos and cement mixture is then passed under a roller 21 for moderate compression and further shaping.

Water to hydrate the cement content of the felted layer is applied by any suitable means. As illustrated, water is preferably added to the belt prior to its entry into fluff box 14 by overflow vat 23, and additional water is applied to the densified layer after its emergence from the nip of roll 21 by overflow vat 22. As indicated in the Brown patent, the water may be added in an equivalent manner by feeding it to the raw materials entering through inlet 13. The amount of water is, of course, sufficient to hydrate the cement, but should be insufficient to cause the wet materials to flow on the conveyor belt under the influence of gravity alone.

Subsequent to the application of water on the upper surface of the web, the felted layer is passed under a cutting roll 24, advantageously after having been first subjected to additional smoothing and light compressing by roller 25. After cutting, the segments are then densified and strongly compressed by passage under pressure roller 26 wherein the segment is subjected to pressures of approximately 200–2600 lbs. per transverse lineal inch as heretofore indicated.

After densification and compression, the "green" fiber-cement sheet is removed from the machine to a supporting element such as a pallet, and is allowed to stand for a sufficient time for the cement to take its initial set. After set, the sheet is preferably trimmed to the desired configuration and is then finally air cured.

Normal cured fiber-cement sheets formed in accordance with this invention may be provided with a fiber-cement surfacing or veneer of the type and in the manner disclosed in the patents to Otis et al. No. 2,446,782 and McQuade No. 1,945,004. In such processes a veneer of fiber and cement is applied to the sheet after an initial compressing by roller 25. While the pressures employed in forming the fiber-cement sheets in accordance with this invention are not considered completely adequate to obtain proper embedment of granules of the type conventionally employed in applying a decorative surface to such dry press products, it is to be understood that granules may be applied to the surface of these sheets in the conventional manner if desired.

Instead of using a dry veneer such as in the procedure disclosed in the patents mentioned above, it is possible and often desirable to surface the sheet with a wet veneer, as for example, a water laid web of asbestos-cement such as that obtained from a conventional Hatschek type wet machine as disclosed in Patent No. Re. 12,594. As indicated in Fig. 3, the wet veneer may be applied to the surface of the web prior to its subjugation to the ultimate press roller. As illustrated, the water laid web may be taken from a conventional wet machine by conveyor 33 and transported by suitable guides, as roller 32, to couch roller 34, which will transfer the sheet to the upper surface of the dry laid web prior to its passage under press roll 26'. If necessary, a doctor blade 36 may be employed to aid in transferring the water laid web from conveyor 30. The conveyor belt may be guided back to the machine by any suitable means, such as guide roller 38. The surface of a sheet formed in this manner closely resembles the wet process asbestos-cement sheets conventionally obtained when employing such a Hatschek wet machine procedure. As is apparent, substantial commercial advantages may be obtained by manufacturing such a sheet by a dry process employing a wet veneer web. It has been found that this procedure results in an extremely smooth surface for such a product and such a surface renders the sheets very desirable for uses in which the surface is exposed and particularly where exposed and decorated.

It will be understood that the details given herein are for the purpose of illustration, not restriction, and that variations within the spirit of the invention are intended to be included in the scope of the appended claims.

What we claim is:

1. The method of manufacturing a dry process normal cured fiber-cement sheet from an intimate mixture formed as a layer from an air suspension upon a felting member to form a web, said web comprising cement particles, staple reinforcing fiber, and water in amount approximately 14 to 25% by weight of the uncured densified web, comprising the steps of compressing said web employing a consolidating roller exerting a pressure of approximately 200 to 2600 lbs. per transverse lineal inch, while preserving the relation between said water content and said pressure within the approximate limits indicated by the solid lines in the accompanying Figure 4, and then air curing said compressed and densified web to harden the cement therein.

2. The method of manufacturing a dry process normal cured fiber-cement sheet from an intimate mixture formed from an air suspension as a layer upon a felting member as a web, said web comprising cement particles, filler particles, staple reinforcing fiber, and water in amount approximately 14 to 25% by weight of the uncured densified web, comprising compressing said web employing a consolidating roller exerting a pressure of approximately 200 to 2600 lbs. per transverse lineal inch, while preserving the relation between said water content and said pressure within the approximate limits indicated by the solid lines in the accompanying Figure 4, and then air curing said compressed and densified web to harden the cement therein.

3. The method of manufacturing a smooth surfaced dry process normal cured fiber-cement sheet from an intimate mixture formed from an air suspension as a layer upon a felting member as a web, said web comprising cement particles, staple reinforcing fiber, and water in amount approximately 14 to 25% by weight of the uncured densified web, comprising applying to the surface of said web a water laid felt of cement particles and asbestos fiber, compressing said web employing a consolidating roller exerting a pressure of approximately 200 to 2600 lbs. per transverse lineal inch, while preserving the relation between said water content and said pressure within the approximate limits indicated by the solid lines in the accompanying Figure 4, and then air curing said compressed and densified web to harden the cement therein.

4. The method of manufacturing a smooth surfaced dry process normal cured fiber-cement sheet from an intimate mixture formed from an air suspension as a layer upon a felting member as a web, said web comprising cement particles, filler particles, staple reinforcing fiber, and water in amount approximately 14 to 25% by weight of the uncured densified web, comprising the steps of applying to the surface of said web a water laid felt of cement particles and asbestos fiber, compressing said web employing a consolidating roller exerting a pressure of approximately 200 to 2600 lbs. per transverse lineal inch, while preserving the relation between said water content and said pressure within the approximate limits indicated by the solid lines in the accompanying Figure 4, and then air curing said compressed and densified web to harden the cement therein.

5. The method of manufacturing a dry process normal cured fiber-cement sheet from an intimate mixture formed from an air suspension as a layer upon a felting member as a web, said web comprising cement particles, staple reinforcing fiber in amount approximately 15 to 50% by weight of the uncured densified web, and water in amount approximately 15 to 20% by weight of the uncured densified web, comprising compressing said web employing a consolidating roller exerting a pressure of approximately 500 to 1300 lbs. per transverse lineal inch, while preserving the relation between said water content and said pressure within the approximate limits indicated by the dash lines in the accompanying Figure 4, and then air curing said compressed and densified web to harden the cement therein.

6. The method of manufacturing a dry process normal cured fiber-cement sheet from an intimate mixture formed from an air suspension as a layer upon a felting member as a web, said web comprising cement particles, filler particles, asbestos fiber in amount approximately 15 to 50% by weight of the uncured densified web, and water in amount approximately 15 to 20% by weight of the uncured densified web, comprising compressing said web employing a consolidating roller exerting a pressure of approximately 500 to 1300 lbs. per transverse lineal inch, while preserving the relation between said water content and said pressure within the approximate limits indicated by the dash lines in the accompanying Figure 4, and then air curing said compressed and densified web to harden the cement therein.

7. The method of manufacturing a smooth surfaced dry process normal cured fiber-cement sheet from an intimate mixture formed from an air suspension as a layer upon a felting member as a web, said web comprising cement particles, staple reinforcing fiber in amount approximately 15 to 50% by weight of the uncured densified web, and water in amount approximately 15 to 20% by weight of the uncured densified web, comprising applying to the surface of said web a water laid felt of cement particles and asbestos fiber, compressing said web employing a consolidating roller exerting a pressure of approximately 500 to 1300 lbs. per transverse lineal inch, while preserving the relation between said water content and said pressure within the approximate limits indicated by the dash lines in the accompanying Figure 4, and then air curing said compressed and densified web to harden the cement therein.

8. The method of manufacturing a dry process normal cured fiber-cement sheet which comprises dispersing an intimate mixture of cement particles, filler particles and asbestos fiber in amount approximately 15 to 50% by weight of the uncured densified web in air to form an air suspension thereof, depositing said suspended mixture as a layer upon a felting member to form a web, applying water to said web in amount approximately 14 to 25% by weight of the uncured densified web, comprising said web employing a consolidating roller exerting a pressure of approximately 200 to 2600 lbs. per transverse lineal inch, while preserving the relation between said water content and said pressure within the approximate limits indicated by the solid lines in the accompanying Figure 4, and then air curing said compressed and densified web to harden the cement therein.

9. The method of manufacturing a smooth surfaced dry process normal cured fiber-cement sheet which comprises dispersing an intimate mixture of cement particles, filler particles and asbestos fiber in amount approximately 15 to 50% by weight of the uncured densified web in air to form an air suspension thereof, depositing said suspended mixture as a layer upon a felting member to form a web, applying water to said web in amount approximately 14 to 25% by weight of the uncured densified web, applying to the surface of said web a water laid felt of cement particles and asbestos fiber, compressing said web employing a consolidating roller exerting a pressure of approximately 200 to 2600 lbs. per transverse lineal inch, while preserving the relation between said water content and said pressure within the approximate limits indicated by the solid lines in the accompanying Figure 4, and then air curing said compressed and densified web to harden the cement therein.

10. The method of manufacturing a dry process normal cured fiber-cement sheet which comprises dispersing an intimate mixture of cement particles, filler particles and asbestos fiber in amount approximately 35 to 45% by weight of the uncured densified web in air to form an air suspension thereof, depositing said suspended mixture as a layer upon a felting member to form a web, applying water to said web in amount approximately 15 to 20% by weight of the uncured densified web, compressing said web employing a consolidating roller exerting a pressure of approximately 500 to 1300 lbs. per transverse lineal inch, while preserving the relation between said water content and said pressure within the approximate limits indicated by the dash lines in the accompanying Figure 4, and then air curing said compressed and densified web to harden the cement therein.

11. The method of manufacturing a smooth surfaced dry process normal cured fiber-cement sheet which comprises dispersing an intimate mixture of cement particles, filler particles and asbestos fiber in amount approximately 35 to 45% by weight of the uncured densified web in air to form an air suspension thereof, depositing said suspended mixture as a layer upon a felting member to form a web, applying water to said web in amount approximately 15 to 20% by weight of the uncured densified web, applying to the surface of said web a water laid felt of cement particles and asbestos fiber, compressing said web employing a consolidating roller exerting a pressure of approximately 500 to 1300 lbs. per transverse lineal inch, while preserving the relation between said water content and said pressure within the approximate limits indicated by the dash lines in the accompanying Figure 4, and then air curing said compressed and densified web to harden the cement therein.

12. The method of manufacturing a dry process normal cured fiber-cement sheet from an intimate mixture formed as a layer from an air suspension upon a felting member to form a web, said web comprising cement particles, filler particles, asbestos fiber in amount approximately 35–45% by weight of the uncured densified web, and water in amount approximately 15–20% by weight of the uncured densified web, comprising the steps of compresssing said web employing a consolidating roller exerting a pressure of approximately 500 to 1300 lbs. per transverse lineal inch, while preserving the relation between said water content and said pressure within the approximate limits indicated by the dash lines in the accompanying Figure 4, and then air curing said compressed and densified web to harden the cement therein.

13. The method of manufacturing a smooth surfaced dry process normal cured fiber-cement sheet from an intimate mixture formed from an air suspension as a layer upon a felting member as a web, said web comprising cement particles, filler particles, and asbestos fiber in amount approximately 35–45% by weight of the uncured densified web, and water in amount approximately 15–20% by weight of the uncured densified web comprising, applying to the surface of said web a water laid felt of cement particles and asbestos fiber, compressing said web employing a consolidating roller exerting a pressure of approximately 500 to 1300 lbs. per transverse lineal inch, while preserving the relation between said water content and said pressure within the approximate limits indicated by the dash lines in the accompanying Figure 4, and then air curing said compressed and densified web to harden the cement therein.

References Cited in the file of this patent

UNITED STATES PATENTS

| | | |
|---|---|---|
| 2,167,440 | Mason | July 25, 1939 |
| 2,230,880 | Brown | Feb. 4, 1941 |
| 2,445,210 | Colton | July 13, 1948 |
| 2,446,782 | Otis et al. | Aug. 10, 1948 |
| 2,480,851 | Goss | Sept. 6, 1949 |
| 2,619,681 | Baker et al. | Dec. 2, 1952 |